US006662560B2

United States Patent
Roy et al.

(10) Patent No.: US 6,662,560 B2
(45) Date of Patent: Dec. 16, 2003

(54) MOTION TRANSDUCER EFFICIENT FOR SMALL AMPLITUDE MOVEMENTS

(75) Inventors: Philippe Roy, St-Bruno (CA); Michel Bérubé, Contrecoeur (CA); Michel Jacques, Lachenaie (CA)

(73) Assignee: D-Box Technology Inc., Longueuil (CA)

( * ) Notice: Subject to any disclaimer, the term of this patent is extended or adjusted under 35 U.S.C. 154(b) by 267 days.

(21) Appl. No.: 09/754,089

(22) Filed: Jan. 5, 2001

(65) Prior Publication Data

US 2001/0017482 A1 Aug. 30, 2001

Related U.S. Application Data

(63) Continuation-in-part of application No. 09/642,756, filed on Aug. 22, 2000, which is a continuation of application No. 09/034,266, filed on Mar. 4, 1998, now Pat. No. 6,139,324.

(51) Int. Cl.[7] .................................................. F15B 7/00
(52) U.S. Cl. ........................................ 60/545; 60/583
(58) Field of Search ...................................... 60/545, 583

(56) References Cited

U.S. PATENT DOCUMENTS

| 3,865,430 | A | | 2/1975 | Tanus |
| 4,750,208 | A | | 6/1988 | Yamada et al. |
| 5,533,336 | A | * | 7/1996 | Kiat et al. .................... 60/545 |
| 5,678,889 | A | | 10/1997 | Purcell, Jr. |

* cited by examiner

*Primary Examiner*—Edward K. Look
*Assistant Examiner*—Michael Leslie
(74) *Attorney, Agent, or Firm*—Ogilvy Renault; Robert Mitchell

(57) ABSTRACT

The system produces movements in a home entertainment chair. It has a motor controller and a plurality of movement generator units for generating small amplitude and low frequency movements in the viewer's chair. The system is intended for home use and can be easily installed under each leg of a chair or of a sofa or at the corners of a platform. The source of movement control signals can be derived from a video presentation soundtrack, and directional movement sensations can be created by inducing controlled movements in each leg of the viewer's chair.

17 Claims, 11 Drawing Sheets

MOTION TRANSDUCER EFFICIENT FOR SMALL AMPLITUDE MOVEMENTS

The present application is a continuation-in-part of U.S. patent application Ser. No. 09/642,756 filed Aug. 22, 2000 which is a continuation of U.S. patent application Ser. No. 09/034,266 filed Mar. 4, 1998, now U.S. Pat. No. 6,139,324.

BACKGROUND OF THE INVENTION

1. Field of the Invention

The present invention relates to a hydraulic motion transducer, and more particularly to tactile and movement sensation generators, as used in motion simulators, for example a home theater simulator.

2. Description of the Prior Art

A traditional movie involves the use of two viewer senses: the sight and the sound. For more than fifty years this was the way of transmitting sensations to viewers. However, recently, new movie technologies have allowed the use of other senses in order to provide an even more realistic experience for the viewers. The tactile and equilibrium senses were added to sight and hearing in order to allow viewers to even "feel" action during a movie.

In many places where the affluence of clients permits, expensive technologies have been implemented, especially in amusements parks. For example, U.S. Pat. No. 5,678,889 to Purcell discloses a modular assembly of theater seats moved by a hydraulic cylinder while U.S. Pat. No. 3,865,430 to Tanus presents a theater chair movable by remote control. However, the hydraulic motors used for moving these chairs in amusement parks have a built-in moving system and are consequently large and expensive. They may only be employed in a large scale application, such as in public theaters. These technologies may not be employed for the large majority of movie screens, which are the home theaters.

Nevertheless, in recent years, new devices for providing tactile sensations to movie viewers emerged in the field of home use. The U.S. Pat. No. 4,750,208 to Yamada et al. disclosed an audio-band electromechanical vibration converter that provides small amplitude vibrations according to a soundtrack. Like this patent, most devices in the field usually comprise a magnetic vibration generator that reproduces the low frequency vibrations of movie soundtrack on contact with the viewers skin. Other devices transmit vibrations to the body of the viewer's chair. However, only very small amplitude vibrations may thus be transmitted to the viewers using those devices and this kind of vibrations do not always reflects the action occurring in the movie. Moreover, such small amplitude vibrations are attenuated by the chair cushion in the case of devices that transmit vibrations to the viewer through the chair, so the viewer may barely feel those tactile sensations. Current devices do not provide enough amplitude of the movements for creating real movement sensations for movie viewers. Since they only perform very simple signal processing such as filtering, they do not provide controlled movements.

SUMMARY OF THE INVENTION

It is therefore an object of the present invention to provide a multi-sense theater chair transducer system for use with a chair or a sofa, that provides both tactile and movement sensations to a home movie viewer by transmitting these sensations to the viewer via the chair or the sofa.

It is another object of the present invention to provide a multi-sense chair transducer system that receives the sound output from a sound system having a plurality of outputs (currently available sound outputs for most sound formats are front, back, left, right, center and subwoofer sound outputs) and computes these sound signals in order to provide directional tactile and movement sensations to the viewer according to the sound signals. In this manner, the movie viewer will feel sensations which are synchronized with the current action from the movie being played.

The present invention comprises three main modules: the first one is the main encoder module which receives the sound signals from a video system such as a digital video disk (DVD or LD), a VCR system, a computer or a simple TV set and performs a digital sound signal analysis in order to output movement codes. Any source of video signal that also comprises a form of sound signals, such as analog or digital encoded sound signal may be employed as well, such as a satellite decoder (SAT) or a PC running a video game. The second module is the motors controller which receives the movement codes from the main encoder module and outputs a power drive signal for the motors in such a way that the motors may run in correlation with the initial sound signals and provide the tactile and movement sensations to the viewer. The mechanical movement module is the last module and it comprises the electrical motors as well as a shaft encoder and a protection circuit for the motors. The present application will only cover the second and the third module of the present system, i.e. the motors controller module and the mechanical movement module.

The movement generator module preferably comprises four devices, each intended to be placed under a corner of a platform, or a leg of a chair or of a sofa in order to transmit the tactile and movement sensations to the viewer. Each device comprises an electrical motor working in association with a cam system or a hydraulic system in order to generate reciprocate movements. The term movement will be used throughout the present text for covering the range of movements starting with vibrations having very small amplitudes and ending with movements having higher amplitudes of the range of one inch. Thus, in the present text, the term movement sensations will cover both sensations involving the tactile sense (created by small amplitude vibrations) and the sense of equilibrium (sensations created by higher amplitude movements) of a movie viewer.

According to the present invention, when a signal is processed by the main encoder module, the movement codes are sent to the motors controller which then activates the motors as commanded by the main encoder, in accordance with the sound signals processed. For example, in a movie having a plurality of output sound signals such as Dolby Surround (TM) or Dolby Digital (TM), one to six different sound signals may currently be available. These signals are processed in real-time by the main encoder which outputs movement action codes for the motor controller and this last one drives the motors for providing directional movement sensations to the movie viewer. For example, with such technology, if a helicopter passes from the left to the right of the screen, the sound will first be output by the left speaker and then gradually pass to the right speaker, so the viewer hears the real passage of the helicopter. The corresponding movement sensations will be at first movements of the device(s) placed under the left leg(s) of the viewer's chair and this movements will gradually pass to the right leg(s) of the chair for providing the same sensation of movement as the sound does.

By using the tactile and equilibrium senses in combination with the sight and the hearing of the movie viewer, the present invention provides tremendous sensation of realism that has never been reached before in a home theater.

According to a preferred embodiment of the invention, there is provided a home entertainment transducer system for generating movement in a chair having at least three legs is provided, the system comprising:

chair leg movement generator means for generating reciprocate movements at each one of said leg of a chair; and motor controlling means for processing a series of movement input codes and generate in response to each input code a sequence of power drive signals for powering said movement generator means to produce small amplitude reciprocate movements in said chair according to said movement codes.

According to another preferred embodiment of the invention, there is provided a movement generator for producing mechanical movements in a chair having at least three legs, the movement generator comprising:

a chair leg receiving surface for supporting a leg of said chair and for transmitting said mechanical movements to said chair;

rotative means for lifting and lowering at small amplitude and low frequency said chair leg receiving surface; and an electric motor coupled to said rotative means.

According to the invention, there is also provided a movement generator for producing small amplitude movements, comprising a supporting surface, a first piston slidable within a chamber for lifting and lowering at small amplitude the supporting surface, a second piston slidable within the chamber for driving up and down the first piston under hydraulic fluid pressure, the first and second piston providing a piston and cylinder arrangement, and an electric motor for linearly reciprocating the second piston in accordance with power drive signals communicated to the electric motor.

Preferably, the movement generator includes a ball screw connected to the electric motor and the second piston, the second piston carrying out axial movement in response to a torque transmitted by the motor to the ball screw.

BRIEF DESCRIPTION OF THE DRAWINGS

The present invention is described and will be better understood with reference to the following drawings, in which.

DETAILED DESCRIPTION OF THE PREFERRED EMBODIMENT

Figure 1:
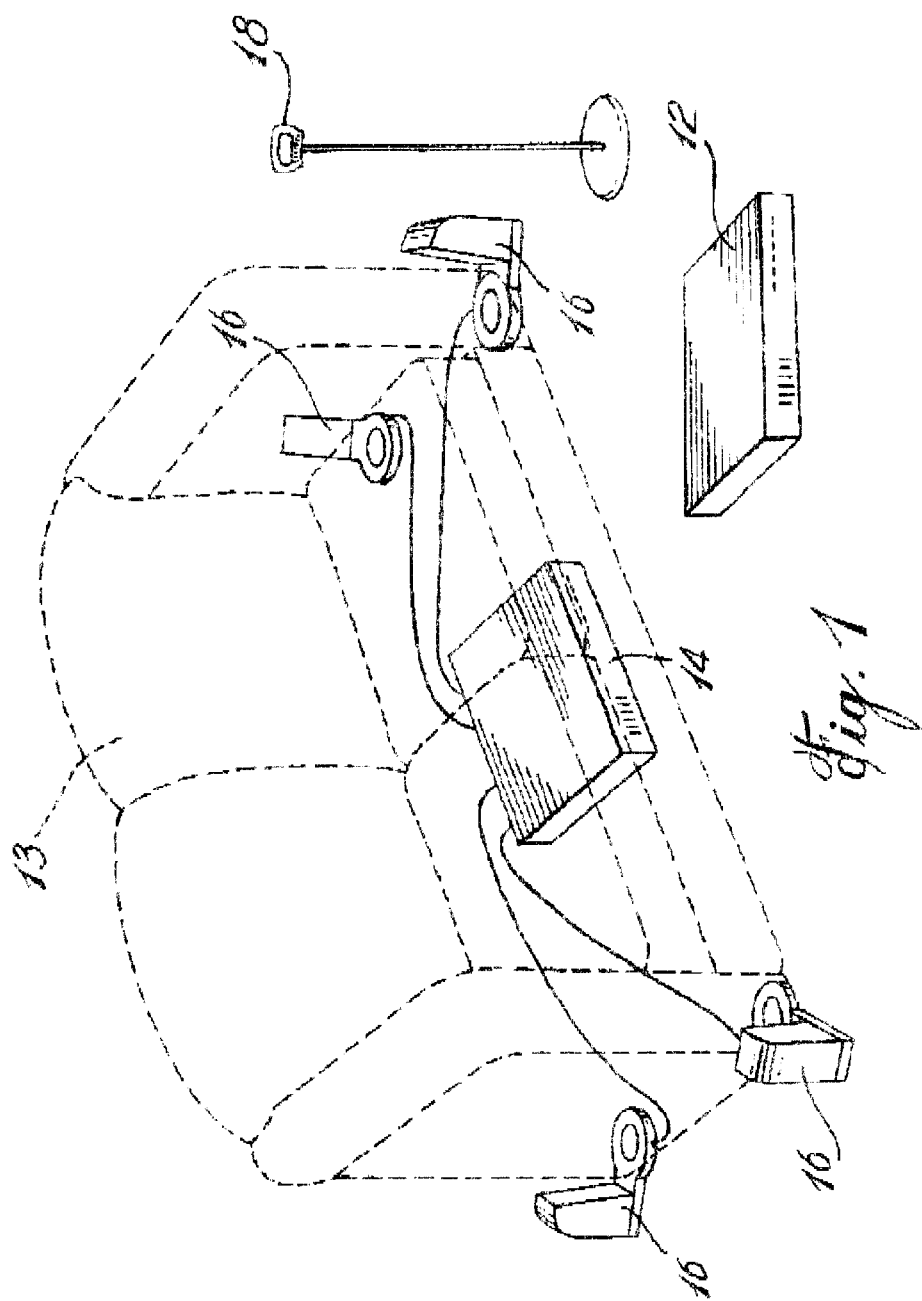
FIG. 1 illustrates the main components of the present invention.

In a preferred embodiment of the present invention, the multi-sense chair transducer system 10 (also called in the present application a home entertainment transducer system) comprises a main encoder module 12, a motor controlling means 14, a chair leg movement generator means 16 associated with each leg 11 of a chair 13 and a remote controller 18, as shown in FIG. 1. The intended location of each module may also be seen from that figure: the main encoder 12 is preferably a digital processing system for processing the sound output of a video system. Such a video system may be a VCR system, a simple TV set, a computer running a video game or any other presentation, a satellite decoder or any other means for playing a video presentation, i.e. a presentation that comprises both sound and image. The main encoder 12 may be placed anywhere in the room, preferably in the neighborhood of the video system. It may communicate via cables or infra-red beams with the motor controlling means 14 which is preferably placed near the chair leg movement generator means 16 which are responsible for the mechanical movement and have to be placed under the legs of the chair in order to transmit the movement to the viewer. It is to be understood that even if the present text only refers to a chair, the term "chair" also cover a sofa or any other supporting means (e.g. a platform) that a movie viewer may use to sit on for watching.

Figure 8:
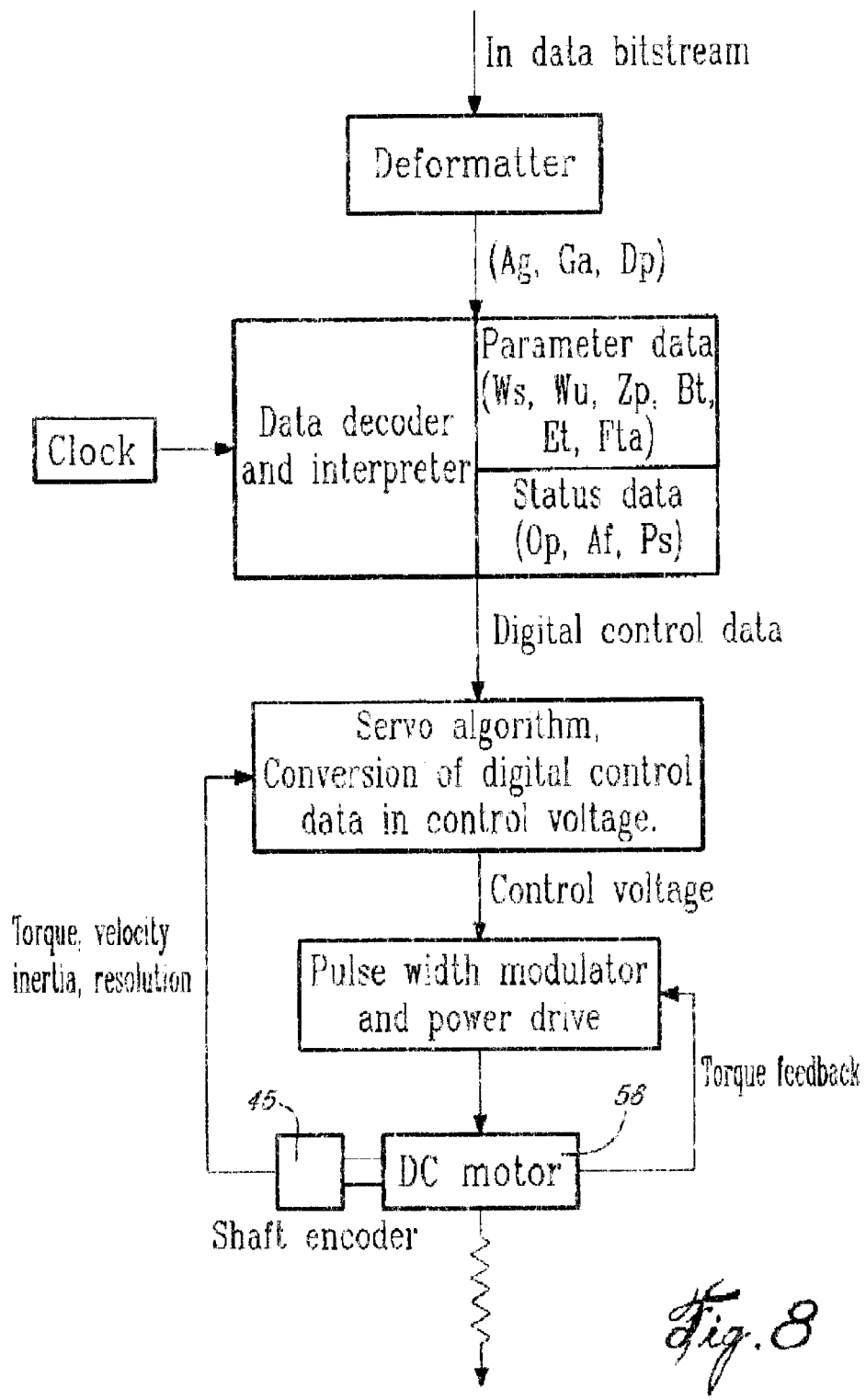
FIG. 8 shows a preferred embodiment of the invention related to the data transmission between the main encoder and the motor controller using the direct access mode.
Figure 9:
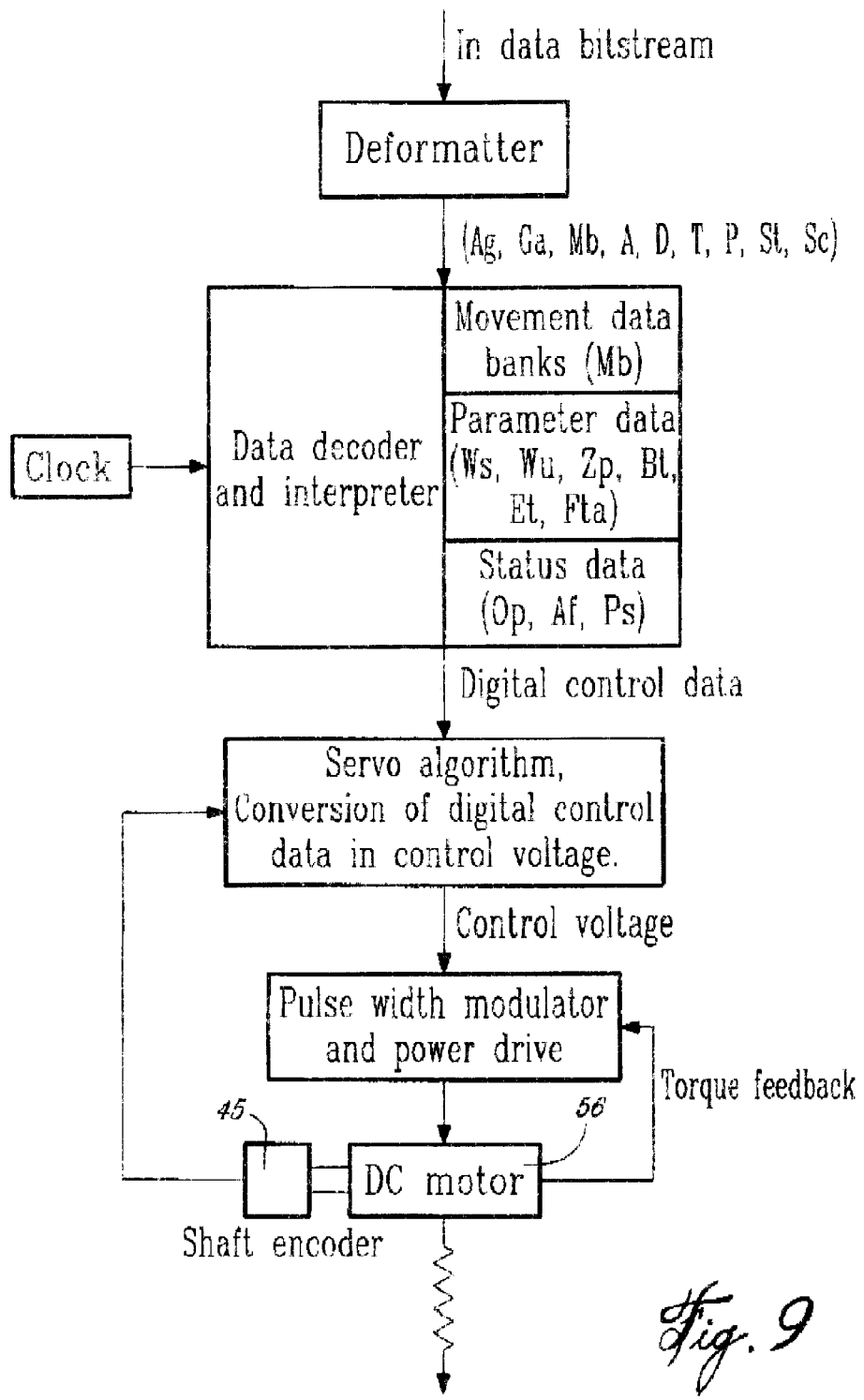
FIG. 9 shows a preferred embodiment of the invention related to the data transmission between the main encoder and the motor controller using the mapping mode.

FIG. 8 shows a preferred embodiment of the invention related to the data transmission between the main encoder and the motor controller using the direct access mode a video presentation on a video system.

Figure 2:
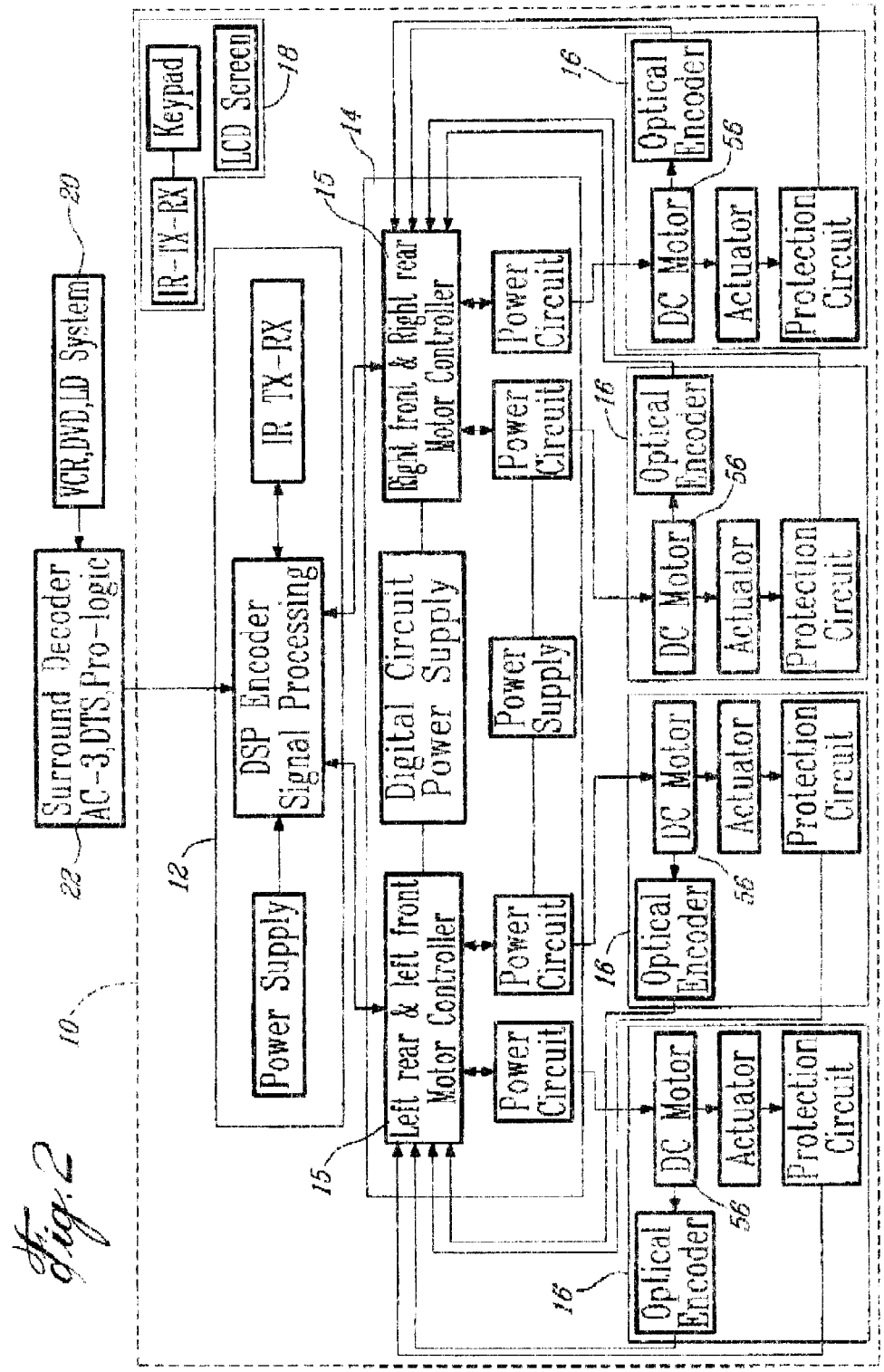
FIG. 2 shows the high level block diagram of a preferred embodiment of the present invention.

FIG. 2 shows the basic structure of the multi-sense system 10. A form of sound signals is used as input for the multi-sense system 10 and are processed in order to produce movement sensations being synchronized with the video presentation sound for the viewer. In the preferred embodiment of the invention, the source of the sound signals may be a video system that preferably outputs a digital or analog form of sound signals, such an AC-3, a DTS or a Pro-Logic format. These sound formats currently comprise up to six different sound signals such as the front-left, the front-right, the rear-left, the rear-right, the center and the subwoofer sound signals. All these signals are received by the main encoder 12 as shown in FIG. 2. The main encoder 12 is preferably a digital signal processing unit that processes the incoming form of sound signal and outputs toward the motor controlling means 14 a series of movement action codes designating the movement sensations the movement generator means 16 are to produce. The movement action codes are preferably strings of digital data that the motor controller uses for outputting a power drive signal for powering the motors in order to produce the movements in accordance with the current sound signal read from the video presentation soundtrack.

Figure 3:
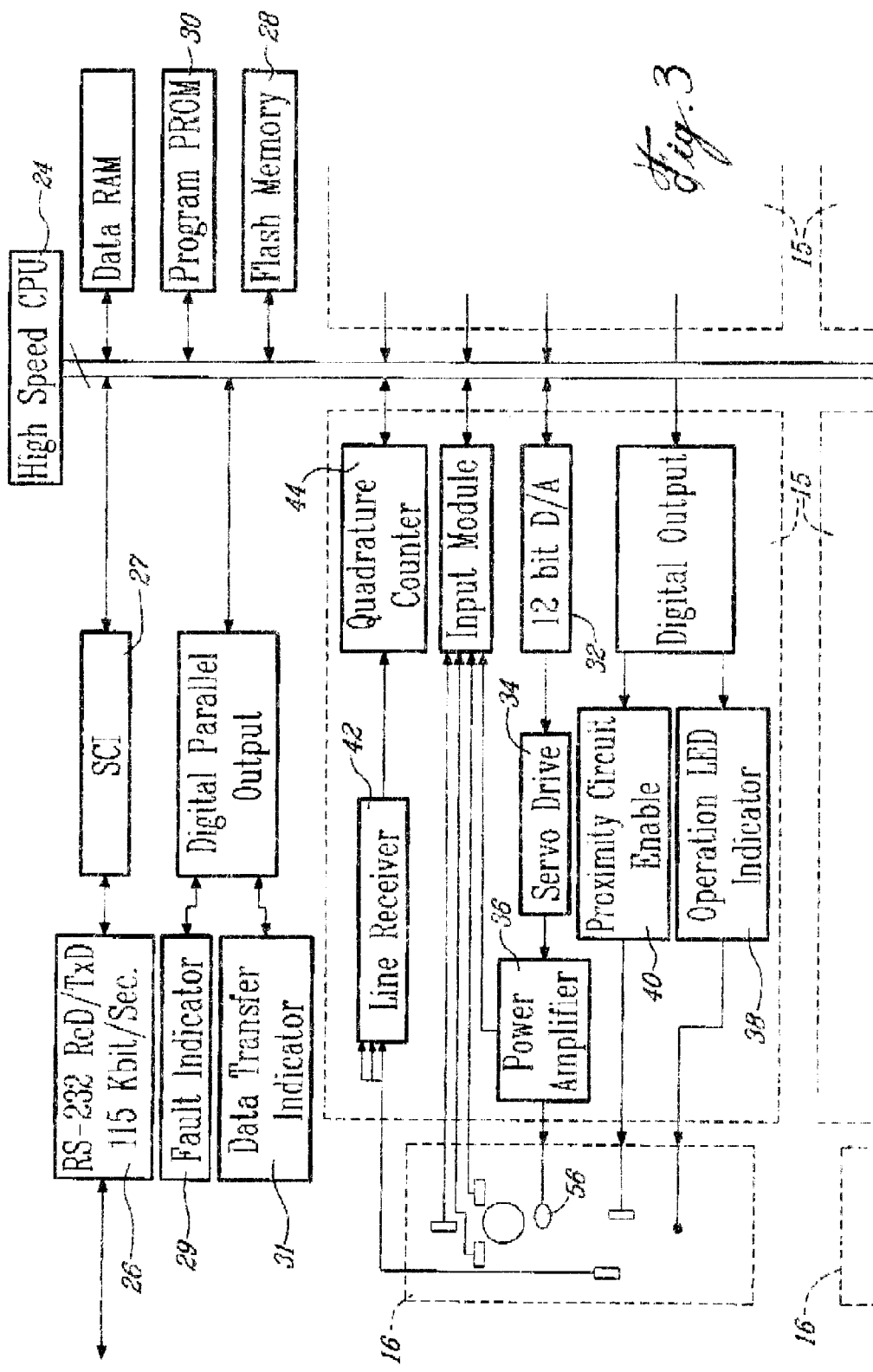
FIG. 3 shows the hardware block diagram of a preferred embodiment of the invention.

FIG. 2 shows a home entertainment transducer system 10 comprising a main encoder 12, a motor controller means 14 and a movement generator means comprising four movement generator units 16, each of them supporting a chair leg 11. However, in FIG. 2, the motor controller 14 comprises only two independent motor controllers sub-modules 15 and therefore using this configuration, the left movement generator units 16 (front and rear) are independent from the right movement generator units 16 (front and rear). Nevertheless, in the preferred embodiment of the present invention, four independent movement generator units are provided, each of them requiring independent control from the motor controller 14. Such a situation is shown in FIG. 3, wherein each of the dotted line blocks is a motor controller submodule 15 independently controlling each of the four movement generator units 16. The movement generator units are preferably operated in pairs.

The Motor Controller

In a preferred embodiment of the present invention, the multi-sense system comprises a motor controller means 14 for driving the movement generator motors according to a series of incoming movement codes representing mechanical movement to be generated according to a video presentation soundtrack, such as a movie soundtrack.

The motor controller 14 is preferably a digital processing unit that receives the movement action codes from the main encoder 12 and, according to these action codes, it generates a power drive signal for powering the electrical motors in order to produce mechanical movements. These action codes are in a digital form and represent the action the motors are to perform. For example, if the rear-left movement generator 16 has to generate a movement following a given path for producing a reciprocate movement, a series of consecutive positions composing this path would be transmitted through the movement action codes, from the main encoder 12 to the motor controller 14. Upon receipt of each action code, the motor controller 14 outputs a power drive signal dedicated to the movement generator 16 to be activated. The electric motor 56 of that movement generator 16 modifies its angular position according to the new coordinates that it is suppose to reach.

In a preferred embodiment of the present invention better seen in FIG. 3, the motor controller 14 comprises a high speed CPU 24, which is the core of the module. The CPU 24 performs the required calculation based on the input movement action codes for generating the power drive signals. It also performs calculation for verification purposes and controls the receiving of the data. The action codes may be received from the main encoder 12 through an RS-232 port 26, allowing data to come in preferably at a rate of 115 Kb/s. However, other communication ports having higher communication speed may be used as well, if required. From this point, incoming data may enter a Serial Communication Interface (SCI) module 27 which is an interface for formatting the incoming data from a serial digital string into a parallel form saving work time to the CPU 24. A secondary microprocessor may also be used for this data formatting purpose rather than the SCI module. A program PROM module 30 may be used for storing the basic program modules required for the CPU operation. These modules may contain the line codes for the unchanging operations of the system, such as the power-up program code. A flash memory 28 may further be used for storing the movement parameters, the movement data banks and the movement status, and for periodic updates of the program. Periodic updates of these parameters may be performed via the serial port 26. These movement parameters will be described in greater detail further in this text.

A fault indicator module 29 may receive feedback from the movement generators 16 in order to provide safety-related information to the user, such as when an overload situation or a mechanical malfunction occur. A data transfer indicator 31 may also provide information to the user concerning the data transfer state. The movement action codes received from the main encoder 12 are processed by the CPU 24 and a digital signal is output toward the sub-module 15 to be used and which appears in dotted line on FIG. 3. A digital to analog (DIA) converter 32 receives the digital signal and transforms it into an analog voltage that may further be filtered and/or processed by a servo drive 34 such as a Pulse-Width Modulator PWM. This signal then enters a power amplifier 36 that outputs a power drive signal having a higher voltage for driving the motors inside the movement generator modules 16. The motor controller 14 may also comprise an operation LED indicator 38 that may stay ON as long the module is turned ON, and a proximity circuitry 40, which safety purpose will be discussed further in this text. As the motor rotates in order to produce movements to be transmitted to the movie viewer, a line receiver module 42 and a quadrature counter 44 are employed in conjunction with a shaft encoder means 45 for keeping track of the motor angular position. This may be performed either by counting the motor's angular rotation or by measuring its angular speed. Preferably, an optical encoder may be used for this purpose but other mechanical or electric means may be employed as well.

In another preferred embodiment of the present invention, the motor controller module 14 may perform an initialization routine each time it is turned ON. Different parameters, such as the weight of the people sifting on the chair 13, may be recorded so that the speed of the movement, the acceleration and the force needed to move the chair 13 may be accurately calculated. The same initialization routine may further comprise adjustment of the motor angular position and a series of verifications regarding the mechanical and electronic components of the system.

In another preferred embodiment of the present invention, the system comprises a remote controller 18 that allows a movie viewer to turn ON and OFF the home entertainment transducer system 10 or even to adjust the characteristics of the movements. For example, switching between movement modes, such as an automatic mode, a music mode or the movie mode would be possible. Choosing the type of movements to be generated for a given movie would be also possible, such as choosing science-fiction movements when watching a science-fiction movie. Each of these modes may have predetermined kinds of movements recorded in data-bases and when the movie viewer selects a mode, these characteristics of the movements are read and applied to the movement. In another variant of the invention, this feature involves the presence of an encoded mode for reading codes specific to a particular movie. For example, the main encoder 12 may comprise encoded movements for particular movies and when these movies are played these codes representing encoded movements may provided even more accurate movements to be produced.

In another preferred embodiment of the invention, the movement action codes may be inserted among the image and sound bit stream recorded on a video support, such as a DVD. These movie DVDs may be especially designed and manufactured for use with the multi-sense systems and may comprise well-defined codes that the system may recognize at the lecture time, thus producing even more accurate movements in particular situations.

The Movement Generators

In a preferred embodiment of the present invention, the multi-sense system comprises a movement generator means composed of four movement generator units intended to be installed under the legs of the viewer's chair 13 for transmitting movements to the viewer through the chair 13. The movement generator units receive a power drive signal from the motor controller 14 and are responsible for converting this signal into mechanical movement which produces the movement sensations to the viewer. However, greater amplitudes may be used as well for providing even greater equilibrium-related sensations to movie viewers, when needed. As better seen in FIG. 4, a movement generator module is mainly composed of an electric motor 56, a movement transmitting system such as a gear system 52 and an actuator or rotative means 54 that transforms the rotative movement into a translation movement and transmits it from the movement generator unit 16 to the chair leg 11.

Figure 4:
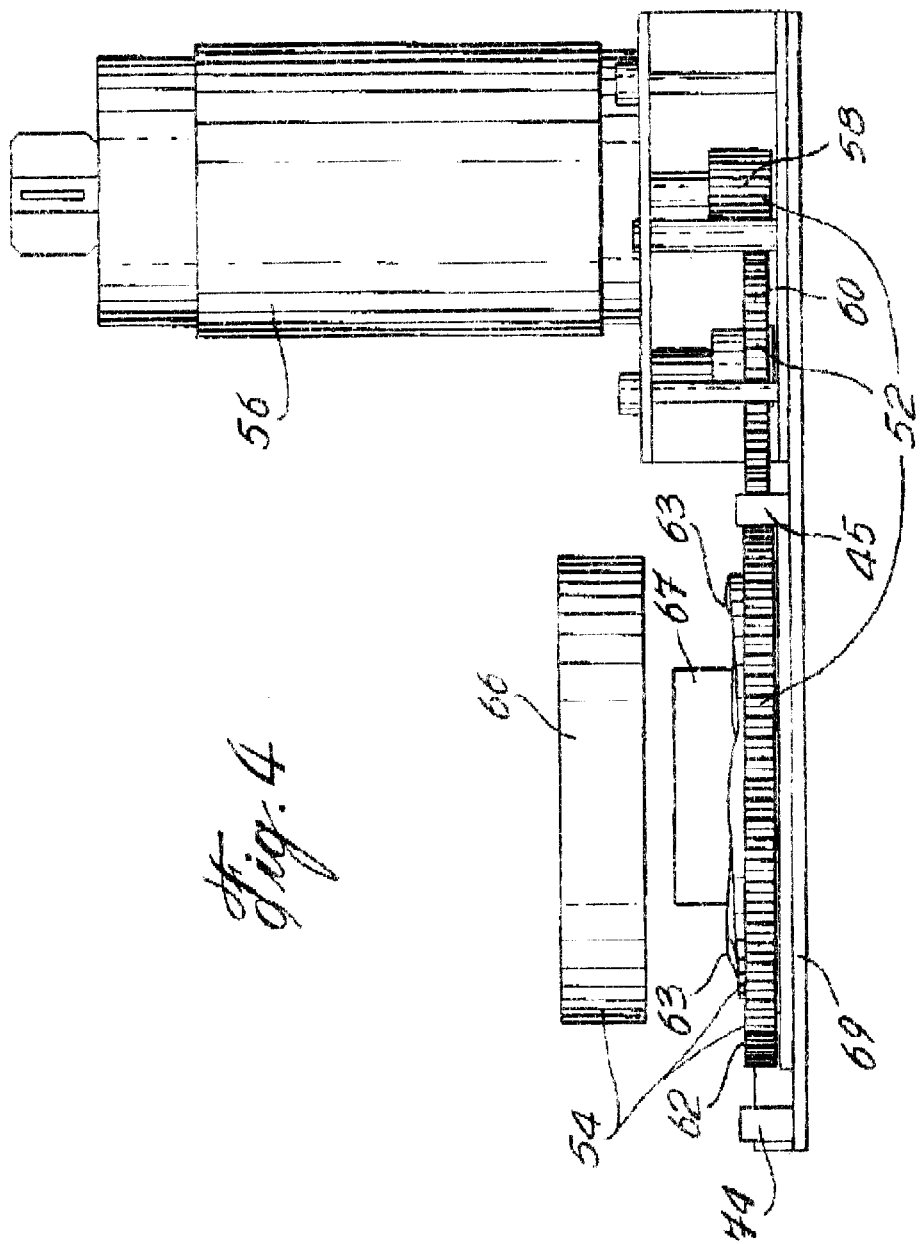
FIG. 4 illustrates a detailed view of the movement generator means as contemplated in a preferred embodiment of the invention.
Figure 5:
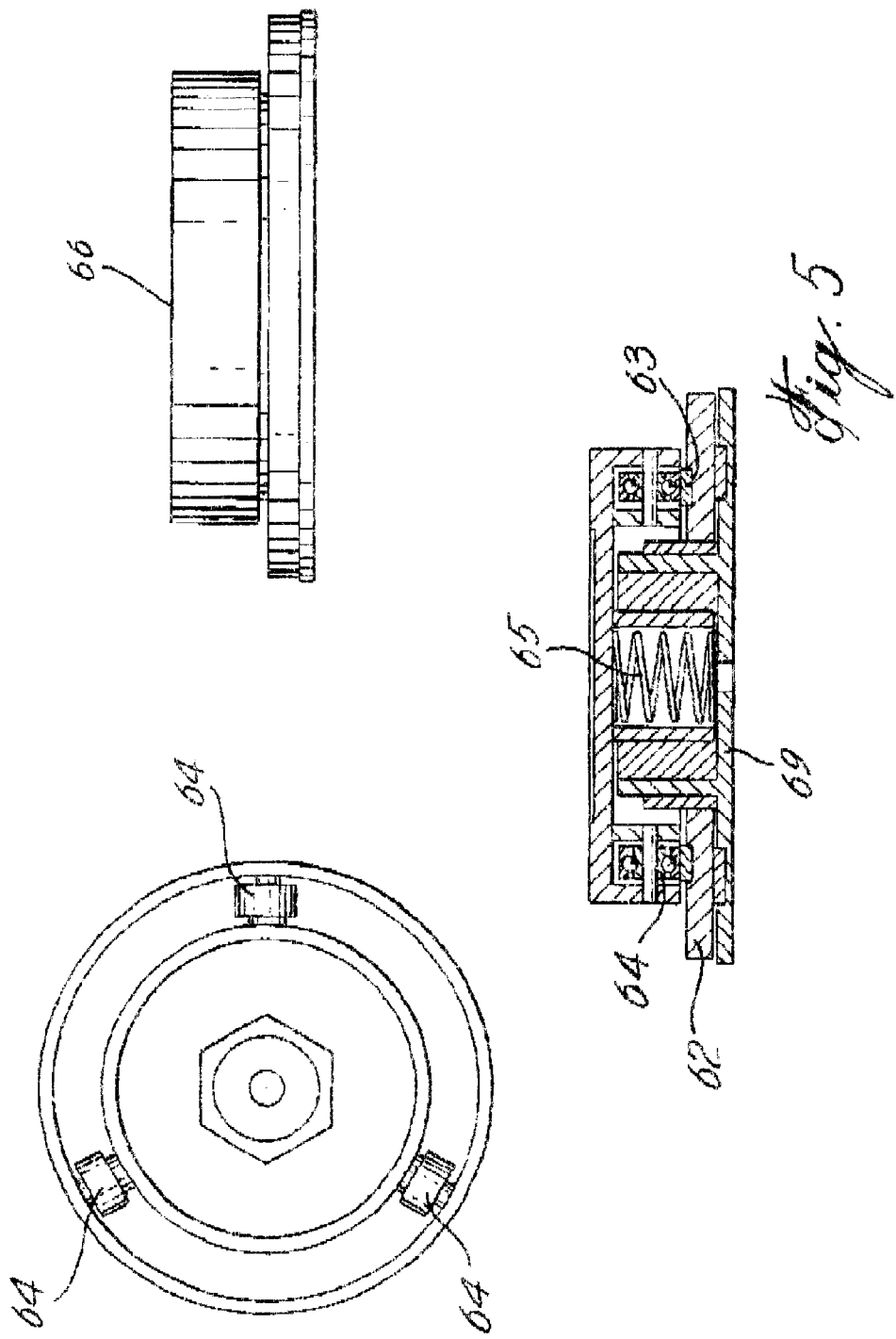
FIG. 5 shows a detailed view of the roller bearing and the actuator that are comprised in the rotative means of a preferred embodiment of the present invention.

The electric motor 56 is preferably a DC motor having its rotating axis in a vertical position, as shown in FIG. 4. The motor shaft gear 58 transmits the rotative movement to the intermediate gear 60 which is in contact with the actuator gear 62. The actuator gear 62 sits onto a thrust bearing means 64 that allows the gear 62 to rotate. Such a thrust bearing means may be a flat bearing having a small clearance, rolling either on small cylinders or on small balls. Its purpose is to allow rotation of the cam onto the base 69. A steel cam 63 is contained in the interior of the actuator gear 62, that steel cam 63 having a plurality of consecutive circular slopes for allowing a roller bearing means 64 (better shown in FIG. 5) to roll on it. Since the steel cam 63 is firmly attached to the actuator gear 62, when the actuator gear 62 rotates the steel cam 63 rotates with it and the roller bearing means 64 is pushed upwardly. The steel cam 63 may also form a single piece with the actuator gear 62 so no more attaching is needed. Since the roller bearing supports the top actuator assembly 66, also herein referred to as the chair leg receiving surface 66, that part is also pushed upwardly according to the movement of the roller bearing and thus transmits the translation movement to the chair leg 11. A linear bearing means 67 may be employed for allowing the up-and-down translation movement to be linear. In the preferred embodiment, the linear bearing means is fixed and has a hexagonal section in which the chair leg receiving surface 66 is firmly attached. In this manner, the chair leg receiving surface 66 can not rotate but only translate following the cam 63 axial direction, i.e. the vertical direction.

The roller bearing means 64 is preferably a three or six roller bearing having each of its rolls rolling on three slopes of the cam 63. However, other configurations of cam may also be used provided that the cam in combination with the roller bearing have a low clearance. If the amplitude of the movement is small, the roller means may only be a frictionless surface sliding on the cam slopes. Concentric track roller bearing means may also be used in association with one or more cams forming concentric slopes, depending on the characteristics of the system. A compression spring 65 may be placed at the center of the roller means a shown in FIG. 5, between the chair leg receiving surface 66 and the base 69. Its purpose is to help the electric motor 56 lifting the chair leg receiving surface 66.

The frequency of the movement may be controlled by controlling the rotative speed of the motor 56. The upward translation is performed when the steel cam 63 rotates in a first direction, so the roller bearing 64, which does not rotate, is lifted when it rolls on the raising slopes of the steel cam 63. When the steel cam 63 is then rotated in the opposite direction, the roller bearing 64 is lowered because it rolls down on the slopes of the cam 63. By rotating the steel cam 63 very quickly forward and backward, an up-and-down movement may be induced to the roller bearing 64 which then transmits this vertical translation to the chair leg receiving surface 66. For avoiding that the chair leg 11 loose contact with the chair leg receiving surface 66 during the downward translation, the system may be set such that the amplitude of the movement decreases with the frequency.

Figure 6:
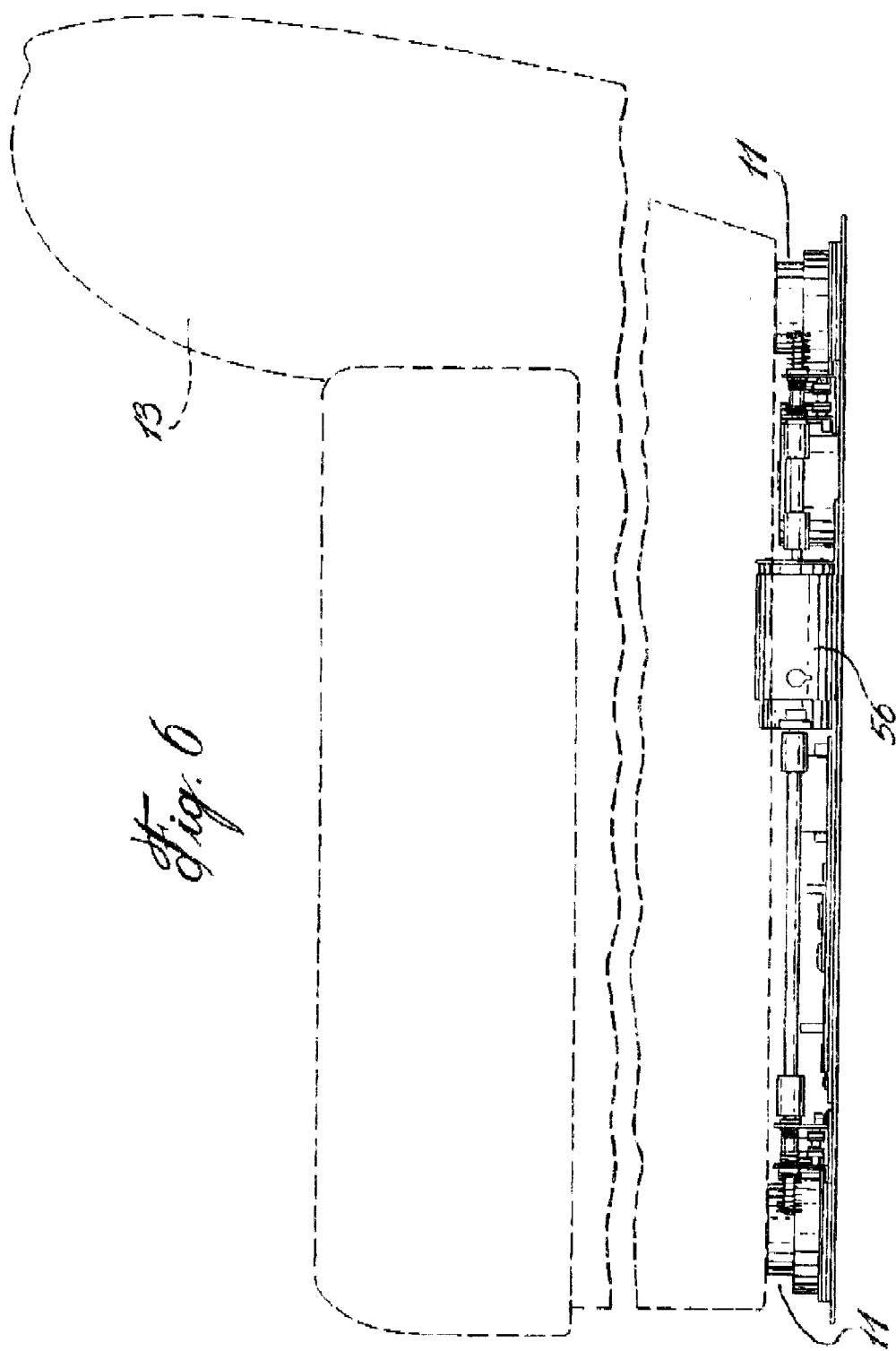
FIG. 6 illustrates a movement generator unit for a pair of chair lateral legs according to a preferred embodiment of the present invention.
Figure 7:
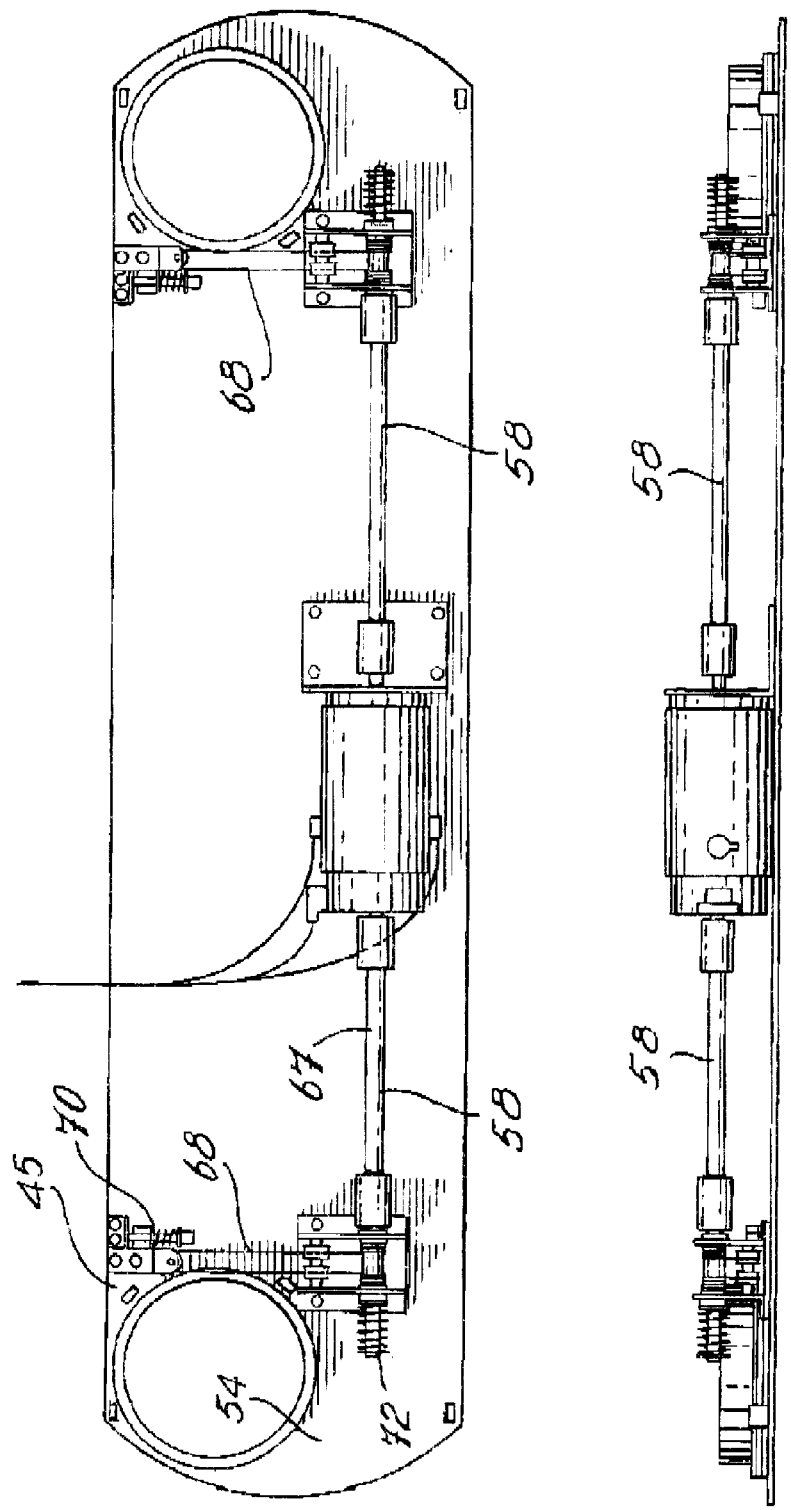
FIG. 7 shows a detailed view of the movement generator for a pair of chair lateral legs.

In another preferred embodiment of the present invention, instead of having four movement generator modules 16, the system only comprises two movement generators, as shown in FIGS. 6 and 7. In that case, such a module supports two lateral legs of the viewer's chair, as shown in FIG. 6, and may comprise only one motor 56 that drives a transmission shaft 58. In that preferred embodiment, the motor 56 lays in a horizontal position and transmits the rotation through the transmission shaft 58 toward the rotative means 66. In that preferred embodiment of the invention, a cable transmission means 67 replaces the gear system 52 for transmitting the rotative movement to the rotative means for lifting and lowering the chair leg receiving surface 66. A cable 68 has its two ends wrapped around the transmission shaft 58 in such a way that when the shaft rotates, one end of the cable is rolled around it while the other end of the cable is unrolled from the shaft, as better shown in FIG. 7. The approximate middle part of the cable 68 may be wrapped around the perimeter of the gear 62 which may have now the form of a pulley, and drives the steel cam, causing it to rotate. The cable may wrapped around the gear's perimeter for more than one complete revolution and may be attached onto a point or a fraction of the gear's perimeter for preventing it from sliding onto the gear's side, or onto the entire gear's perimeter if it makes more than one complete tour of the gear 62. Compression spring means 70 may also be used for tightening up the cable 68. A torsion spring 72 may be added between the transmission shaft 58 and a fixed axis for combating the rotative means moment of inertia, especially when the electric motor begins to rotate or when passing from one angular direction to another. The torsion spring is attached in such a way, that it also helps more the motor 56 to rotate when the motor has to lift the charge than when the motor 56 lowers its charge. In fact, the torsion spring may pester the motor to rotate when lowering the charge for equilibrating the power the motor has to provide between lowering and lifting charges. When the motor 56 rotates, the rotative movement is transmitted to the transmission shaft 58 that pulls the cable 68 by rolling it around the shaft and the cable 68, which is attached to the perimeter of the circular steel cam 63 or of the gear 62, transmits the rotation to the cam 63. From that point, the rotative means transforms the rotative movement into a translation movement, as previously explained in detail.

In another preferred embodiment of the present invention, a proximity sensor 74 may be used and installed around the movement generator units 16 for preventing that people insert a part of their body under the chair when the chair is lifted at a maximum height from the floor. In that case, the proximity detector 74 may send an emergency signal to the motor controller 14, and the motor controller may immediately either cut off the power drive signal or may lift to the highest position and keep there the roller bearing 63 from the cam 62, for avoiding any possible injury to the person. Such proximity sensor may use infra-red beams between the movement generator units 16 or physical movement detectors, such as cables between the units.

In another preferred embodiment of the present invention, the chair transducer system may receive the sound signals from a sound system that does not provide also video images. In that case, the user will only listen to the music and feel tactile and motion sensations related to the music.

In another preferred embodiment of the invention, the motor controller 14 may be incorporated into the chair leg movement generator units 16. Each of these units 16 may comprise their own motor controller module that may receive its own movement codes from the main encoder 12. This way, the movement controller unit 14 would be eliminated since all its parts would be incorporated into the movement generator units 16.

Figure 10:
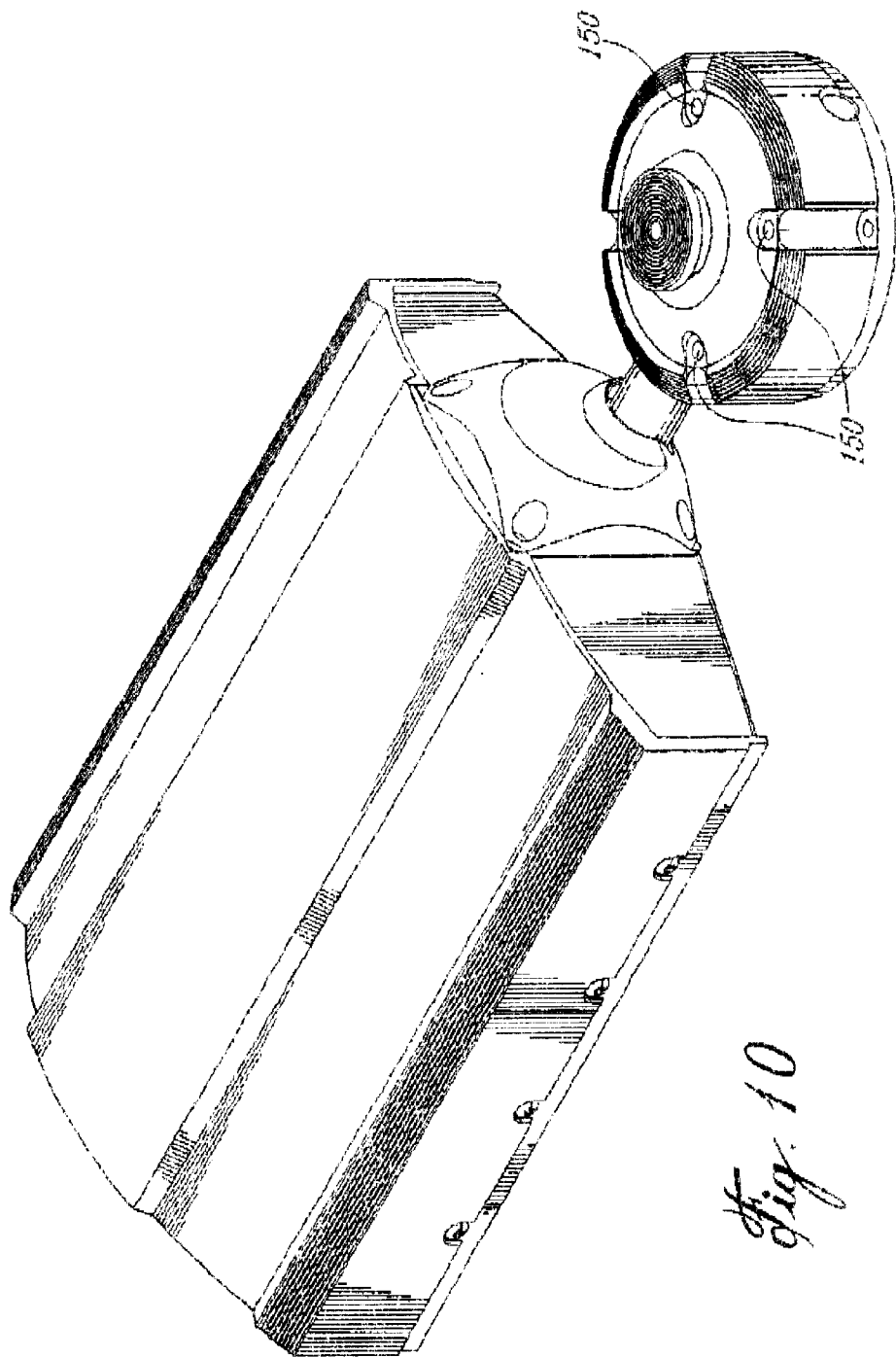
FIG. 10 is a perspective view of a movement generator unit in accordance with a further preferred embodiment of the present invention.

FIG. 10 illustrates a further construction of a movement generator unit 110 which is adapted to be placed under a leg of a chair to generate reciprocate movements thereat. Typically, such a movement generator unit is placed under each leg of a chair or at each corner of a platform on which the chair is mounted. The movement generator units are typically operated in pairs to generate a variety of movements.

Figure 11:
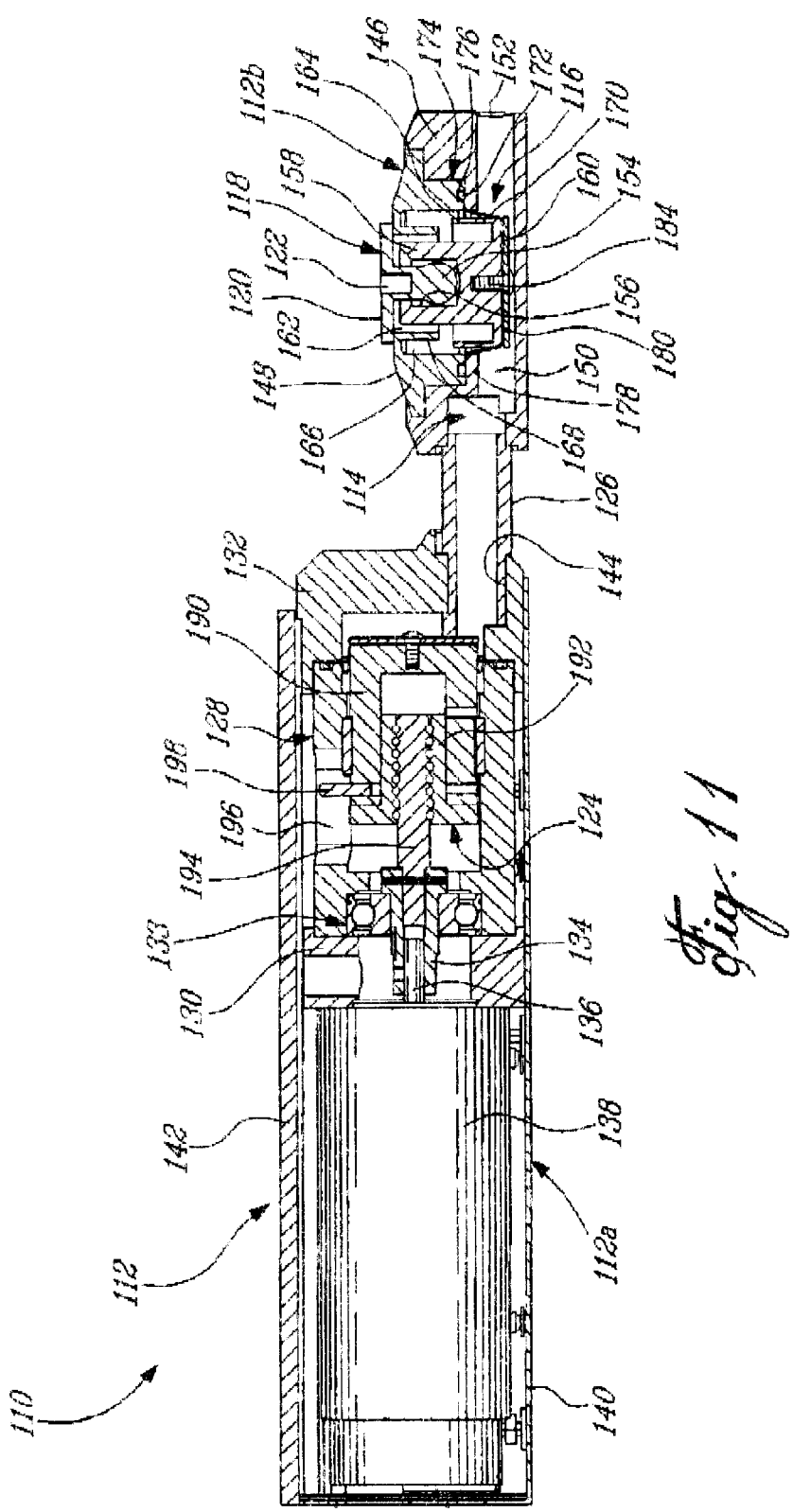
FIG. 11 is a cross-sectional side view of the movement generator unit of FIG. 10.

As shown in FIG. 11, the movement generator unit 110 generally comprises a base 112 defining a chamber 114 in which a first piston 116 is slidably mounted for raising and lowering a chair adaptor 118 having a leg supporting surface 120 defining an axially extending threaded bore 122 adapted to receive a fastener (not shown) for releasably securing one leg of a chair thereto. As will be seen hereinafter, a motor-driven piston 124 is also slidably mounted within the chamber 114 to displace the first piston 116 under fluid pressure.

The base 112 includes a main rectangular base member 112*a* and a secondary circular base member 112*b* connected to the main base member 112*a* by an intermediate tube 126. The main base member 112*a* includes a horizontal hollow cylinder 128 mounted between a pair of opposed end plates 130 and 132 attached to each other by means of axially extending threaded rods (not shown). A bearing 133 is mounted at one end of the cylinder 128 adjacent the end plate 130 for rotatably supporting a coupling 134 securely mounted on an output shaft 136 of a DSP-controlled brushless AC motor 138. The motor 138 could also be linear motor acting directly on the cylinder 190, and thus eliminating the need for the ball screw.

The cylinder assembly and the electric motor 138 are supported on a bottom plate 140 upon which a cover 142 can be releasably attached to form an enclosure. A bore 144 is defined in the end plate 132 for receiving the tube 126. The tube 126 is thereby connected in fluid flow communication with the interior of the hollow cylinder 128. The tube 126 is connected at its opposed end to a cylindrical body 146 forming part of the secondary base member 112*b*. A recess is defined in the top surface of the cylindrical body 146 for receiving a cover 148. Circumferentially space-apart holes 150 (FIG. 10) are defined in the cover 148 for receiving corresponding fasteners (not shown) in order to secure the cover 148 to the cylindrical body 146. The cover 148 and the cylindrical body 146 cooperate to define a cavity 150 which is in fluid flow communication with the tube 126 and, thus, the hollow cylinder 128. An inlet 152 is defined in the cylindrical body 146 for allowing the chamber 114, which is formed by the internal space of the hollow cylinder 128 and the tube 126, and the cavity 150, to be filled up with a liquid, such as oil. A closure (not shown) is provided for closing the inlet 152 once the chamber 114 has been filled up.

The chair adaptor 118 has a bottom ball formation 154 freely received in an axially extending socket 156 defined in an axially extending stem portion 158 of the first piston 116. The stem portion 158 extends upwardly from a downwardly facing surface 160 of the first piston 116. A central opening 162 is defined in the cover 148 for allowing the stem portion 158 to project outwardly of the chamber 114. An annular peripheral wall 164 extends upwardly from the periphery of the downwardly facing surface 160 about the stem portion 158. The annular peripheral wall 164 is received in an annular recess 166 formed by a central cylindrical projection 168 depending downwardly from the inner surface of the cover 148. In operation, the first piston 116 moves vertically about the central cylindrical projection 168.

As seen in FIG. 11, a diaphragm or web member 170 has an integral peripheral ring 172 captively received in an annular seat 174 formed by an annular recess 176 defined in the inner surface of the cover 142 and an annular inner shoulder 178 defined in the cylindrical body 146. The web member 170 extends across a vertical section of the chamber 114 to act as a piston seal. The web member 170 has a central portion 180 which covers the downwardly facing surface 160 of the first piston 116 and which is secured thereto by means of a fastener extending through a disc 182 and into an axially extending threaded bore 184 defined in the downwardly facing surface 160 of the piston 116. The portion of the web member 170 extending between the peripheral ring 172 and the central portion 180 acts as a foldable skirt 186 which can telescope upon itself for allowing the first piston 116 to slide vertically within the chamber 114 while preserving the integrity of the piston seal. The downward movement of the first piston 116 will cause the skirt 186 to unfold, whereas the upward movement of the piston 116 will cause the skirt 186 to fold upon itself. The web member 170 is made of a flexible, pressure resistance, fluid impermeable material (i.e. rubberized nitrile).

A second web member 188 similar to the first web member 170 can be provided to act as a piston seal for the motor-driven piston 124. The duplicate description of the characteristics thereof will be omitted for brevity.

The motor-driven piston 124 generally comprises a cylindrical piston member 190 securely mounted on an internally threaded member 192, which is in turn threadably mounted on a motor-driven shaft 194 for longitudinal movements therealong in response to rotative movements of the motor-driven shaft 194. The member 194 is a ball screw spindle, and the member 192 is a ball screw nut. According to a preferred embodiment of the present invention, the cylindrical piston member 190 and the internally threaded member 192 are jointly displaced by a distance of ½ inch for four complete turns of the motor-driven shaft 194. By reversing the direction of rotation of the motor-driven shaft 194, the direction of travel of the cylindrical piston member 192 and the internally threaded member 194 is reversed, thereby allowing the motor-driven piston 124 to be reciprocated within a horizontal section of the chamber 114.

A longitudinal slot 196 is defined in the horizontal cylinder 128 for receiving a pin 198 supporting a bearing extending radially outwardly from the cylindrical piston member 190. The pin 198 is constrained to move within the slot 196, thereby preventing the cylindrical piston member 190 and the internally threaded member 192 from rotating with the motor-driven shaft 194. The motor-driven shaft 194 is drivingly connected to the coupling 134 which is, in turn, drivingly connected to the output shaft 136 of the electric motor 138.

In operation, the electric motor 138 receives a power drive signal from a motor controller and rotates the motor-driven shaft 194 in accordance with the received signal. For instance, when it is desired to raise the chair adaptor 118, the motor 138 rotates the motor-driven shaft 194 in an appropriate direction so as to axially displace the cylindrical piston member 190 against the fluid contained in the chamber 114. This will cause the first piston 116 to rise under the fluid pressure by a distance corresponding to the displacement of the cylindrical piston member 190. As will be appreciated, the cross-section ratio of the horizontal and vertical cylinder sections defines the actuator's linear transmission ratio. Knowing the pitch of the motor-driven shaft 194 and of the associated internally threaded member 192, it is possible to precisely control the mechanical movement transmitted to the chair adaptor 118.

When it is desired to lower the first piston 116, the motor-drive shaft 194 is rotated in the opposite direction so as to cause the retraction of the cylindrical piston member 190 into the horizontal cylinder 128, thereby allowing the first piston 116 to move downwardly under the load supported thereby. The retraction of the cylindrical piston member 190 also creates a "suction effect" which contributes to lower the first piston 116.

The position limits are detected by sensing the current drawn by the motor as a function of rotational position. Rotational position is detected using the optical encoder 12. The upper limit is determined by forcing the actuator upwardly until the upper edge of 164 contacts the upper edge of 166. At the point of contact, the current drawn will be great and the rotation zero, as measured by the encoder 12. The lower position can be detected by counting the rotation of the motor, or by detecting an increase in current near the bottom of the travel as screw 184 contacts the bottom plate of housing 146. The DSP is programmed to set "soft" limits for the upper and lower limits which are safely within the actual physical limits (e.g. within 10 to 15 mils above and about 60 mils below of physical limits). This prevents any knocking and any damage to the web member.

The hydraulic actuator according to the preferred embodiment has the ability to lift up to 400 hundred pounds and to move such a heavy mass in an oscillatory motion with about a 0.25" (6 mm) amplitude using a brushless DC motor (average power consumption of 100 W) at up to 150 Hz and an acceleration of 2 g. The presently preferred nominal maximum operating frequency of the actuators is 100 Hz.

Data Transmission

The motor controller module 14 exchanges data in a bi-directional manner with the main encoder 12. Information regarding the full travel area (fta) or status fault indicators are passed along to the main encoder 12 to organize data accordingly.

The Direct Access Mode is the preferred mode of data transmission. In this mode, the input bit stream is composed of digital scheme codes called blocks. Each block may be formed of sequential data words (Ag, Ga, Dp) that the motor controller module 14 may deformat and decode. These codes are:

Ag: is the movement generator grouping parameter; each movement generator can be grouped with other movement generator(s) or can be addressed individually.

Ga: is the movement generator identification number or the movement generator group identification number; in the individual address mode, the Ga data indicates the movement generator number that will receive the position data Dp, which will give the position to be reached within the Full Travel Area fta. In group mode, the movement generators are grouped together and the Ga data indicates the movement generators group number addressed while the last data words of the bit stream will provide the requested position in respect to the full travel area fta.

Dp: position information in respect to the full travel area.

After complete reception and data verification of the transmitted data block(s), the motor controller 14 decodes the information and generates the required power drive signal for the motors 56 for performing the requested movements. It also controls the complete motors feedback to make sure the movements are accurate. When performing these tasks, the motor controller 14 may also use data read during the initialization routine, such as: the weight of the chair or sofa Ws, the weight of the users Wu, the zero position Zp, the bottom of travel Bt, the end of travel Et, the overload protection status Op, the amplifier fault status Af, the proximity sensors status Ps and all the motor drive parameters such as the torque, the velocity, the inertia, and the resolution.

The mapping mode is a second mode that may be used as a data transmission protocol between the main encoder 12 and the motor controller 14. In this case, the bit stream is also composed of data blocks but these blocks comprises different data words. These words that the motor controller 14 deformat and decodes are described bellow:

Ag: is the movement generator grouping parameter; each movement generator can be grouped with other movement generator(s) or can be addressed individually.

Ga: is the movement generator identification number or the movement generator group identification number; in the individual address mode, the Ga data indicates the movement generator number that will receive the position data Dp which will give the position to be reached within the full travel area fta. In group mode, the movement generators are grouped together and the Ga data indicates the movement generators group number addressed while the last data words of the bit stream will provide the requested position in respect to the full travel area fta.

Mb: are the movement data banks. These data banks include the necessary data information to complete a motion scheme and serve as a base for the motion sequence being called upon by the main encoder 12. For example, one data bank may be composed of data representing a starting car engine. Other movement data banks may represent in digital format a complete sequence of motion, such as a starting engine, a car acceleration and cruise movements.

A: is the amplitude parameter of the power drive signal. The data transmits to the system the magnitude of the motion to be performed and modulates the movement data bank accordingly.

D: is the movement direction parameter that indicates the movement transfer from one movement generator to another.

T: is the transfer rate used in conjunction with D. They indicate the percentage of motion transfer to be done from one movement generators to others and ranges from 0 to 100%.

P: is the phase control signal of a movement generator with respect to another movement generator; it may range from 0 to 180 degrees.

St: is the sweep time, used in conjunction with D and T in order to complete a sweep sequence.

Sc: represent a synchronization mode. The movements of the movement generators may be either synchronized or non-synchronized.

In the mapping mode too, after complete reception and data verification of the transmitted data block(s), the motor controller 14 decodes the information and generates the required power drive signal for the motors 56 for performing the requested movements. It also controls the complete motors feedback to make sure the movements are accurate. When performing these tasks, the motor controller 14 may also use data read during the initialization routine, such as: the weight of the chair or sofa Ws, the weight of the users Wu, the zero position Zp, the bottom of travel Bt, the end of travel Et, the overload protection status Op, the amplifier fault status Af, the proximity sensors status Ps and all the motor drive parameters such as the torque, the velocity, the inertia, and the resolution.

What is claimed is:

1. A movement generator for producing small amplitude movements, comprising:
   a supporting surface;
   a first piston slidable within a chamber for lifting and lowering at small amplitude said supporting surface;
   a second piston slidable within said chamber for driving up and down said fitst piston under hydraulic fluid pressure, said first and second piston providing a piston and cylinder arrangement;
   an electric motor for linearly reciprocating said second piston in accordance with power drive signals communicated to said electric motor; and
   a ball screw connected to said electric motor and said second piston, said second piston carrying out axial movement in response to a torque transmitted by said motor to said ball screw.

2. A movement generator as defined in claim 1, wherein said second piston includes a radial projection which is constrained to move in an axially extending slot, thereby preventing said second piston from rotating with said shaft.

3. A movement generator as defined in claim 1, wherein said chamber is defined in a base adapted to be placed under a chair.

4. A movement generator as defined in claim 3, wherein said first piston is slidable within a vertical section of said chamber, whereas said second piston is slidable within a horizontal section of said chamber, said horizontal and vertical sections being in fluid flow communication.

5. A movement generator as defined in claim 3, wherein an inlet is defined in said base for allowing said chamber to be filled with a fluid.

6. A movement generator as defined in claim 1, wherein said chamber is circumscribed by an inner wall, and wherein said movement generator further comprises a piston seal, said piston seal including a web member secured to a head portion of said piston and having a peripheral portion retained captive in an annular seat defined in said piston and cylinder arrangement to form a seal between said first piston and said inner wall of said chamber, said web member being adapted to telescope upon itself as said first piston is reciprocated within said chamber.

7. A movement generator as defined in claim 6, wherein said head has a downwardly facing surface and an annular peripheral wall extending axially upwardly from said downwardly facing surface, said web member being secured to said downwardly facing surface and forming a foldable skirt about said annular peripheral wall.

8. A movement generator as defined in claim 7, wherein an integral peripheral ring is provided at said peripheral portion of said web member, said peripheral ring being received within said annular seat.

9. A movement generator as defined in claim 7, wherein said supporting surface is provided at a top end of a chair adaptor, and wherein said first piston has a central stem extending upwardly from said downwardly facing surface and inwardly of said annular peripheral wall, said central stem having a distal end defining an axially extending socket for receiving a bottom end portion of said chair adaptor.

10. A movement generator as defined in claim 9, wherein said chair adaptor is freely received in said axially extending socket.

11. A movement generator as defined in claim 10, wherein said chair adaptor is provided at said bottom end portion thereof with a terminal ball formation adapted to fit within said axially extending socket for supporting said chair adaptor on said first piston.

12. A small amplitude actuator comprising a base defining a chamber filled up with a fluid, a first piston freely mounted for slidable movement within said chamber, a motor-driven piston slidably mounted within said chamber for displacing said first piston under fluid pressure, a motor adapted to receive power drive signals for displacing said motor-driven piston so as to push or draw said fluid against and away From said first piston, and a ball screw connected to said motor and said motor-driven piston.

13. A small amplitude actuator comprising a base having an inner wall defining a chamber in which a piston is slidably mounted for reciprocate movements, and a piston seal including a web member secured to said piston and having a peripheral portion retained captive in an annular seat defined in said base to form a sealing skirt between said piston and said inner wall, said sealing skirt being adapted to telescope upon itself for allowing said first piston to slide within said chamber while preserving the integrity of said piston seal.

14. A small amplitude actuator as defined in claim 13, wherein said piston has a head having a radial surface and an annular peripheral wall extending axially from said radial surface, said web member having a central portion secured to said radial surface.

15. A small amplitude actuator as defined in claim 14, wherein an integral peripheral ring is provided at said peripheral portion of said web member, said peripheral ring being received within said annular seat.

16. A movement generator for producing small amplitude movements, comprising:
   a supporting surface;
   a first piston slidable within a chamber for lifting and lowering at small amplitude said supporting surface;
   a second piston slidable within said chamber for driving up and down said first piston under hydraulic fluid pressure, said first and second piston providing a piston and cylinder arrangement;
   an electric motor for linearly reciprocating said second piston in accordance with power drive signals communicated to said electric motor; and
   wherein said chamber is circumscribed by an inner wall, and wherein said movement generator further com prises a piston seal, said piston seal including a web member secured to a head portion of said piston and having a peripheral portion retained captive in an annular seat defined in said piston and cylinder arrangement to form a seal between said first piston and said inner wall of said chamber, said web member being adapted to telescope upon itself as said first piston is reciprocated within said chamber.

17. A movement generator for producing small amplitude movements, comprising:

a supporting surface;

a first piston slidable within a chamber for lifting and lowering at small amplitude said supporting surface;

a second piston slidable within said chamber for driving up and down said first piston under hydraulic fluid pressure, said first and second piston providing a piston and cylinder arrangement, wherein said second piston includes a radial projection which is constrained to move in an axially extending slot, thereby preventing said second piston from rotating with said shaft; and an electric motor for linearly reciprocating said second piston in accordance with power drive signals communicated to said electric motor.

* * * * *